United States Patent
Kindl et al.

(10) Patent No.: US 10,612,562 B2
(45) Date of Patent: Apr. 7, 2020

(54) RADIAL TURBOCHARGER COMPRISING A SWIRL GENERATOR

(71) Applicant: Ford Global Technologies, LLC, Dearborn, MI (US)

(72) Inventors: Helmut Matthias Kindl, Aachen (DE); Vanco Smiljanovski, Bedburg (DE); Joerg Kemmerling, Monschau (DE); Andreas Kuske, Geulle (NL); Franz Arnd Sommerhoff, Aachen (DE); Franz J. Brinkmann, Huerth-Efferen (DE); Frank Kraemer, Neunkirchen-Seelscheid (DE); Hanno Friederichs, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 587 days.

(21) Appl. No.: 15/410,562

(22) Filed: Jan. 19, 2017

(65) Prior Publication Data
US 2017/0211588 A1  Jul. 27, 2017

(30) Foreign Application Priority Data
Jan. 22, 2016 (DE) .................. 10 2016 200 918

(51) Int. Cl.
| | |
|---|---|
| *F04D 29/46* | (2006.01) |
| *F02C 7/042* | (2006.01) |
| *F04D 27/02* | (2006.01) |
| *F02B 33/40* | (2006.01) |
| *F02M 35/10* | (2006.01) |
| *F04D 29/22* | (2006.01) |

(52) U.S. Cl.
CPC ............ *F04D 29/464* (2013.01); *F02B 33/40* (2013.01); *F02C 7/042* (2013.01); *F02M 35/10157* (2013.01); *F04D 27/0253* (2013.01); *F04D 29/22* (2013.01); *F05D 2220/40* (2013.01); *F05D 2250/51* (2013.01); *Y02T 10/144* (2013.01); *Y02T 10/146* (2013.01)

(58) Field of Classification Search
CPC ........ F02B 37/225; F02B 37/16; F02B 33/40; F01D 17/141; F01D 17/143; F04D 27/0253; F04D 29/464; F04D 29/4213; F04D 29/441; F04D 29/22
USPC ...................................... 123/559.1
See application file for complete search history.

(56) References Cited

U.S. PATENT DOCUMENTS

| | | | |
|---|---|---|---|
| 4,222,703 A | 9/1980 | Schaum et al. | |
| 8,820,071 B2 * | 9/2014 | Tkac ................ | F02B 37/00 415/183 |
| 2009/0249786 A1 * | 10/2009 | Garrett ............. | F01D 1/06 60/612 |

FOREIGN PATENT DOCUMENTS

| | | |
|---|---|---|
| DE | 102004039299 A1 | 2/2006 |
| DE | 102007058603 A1 | 6/2009 |
| DE | 102008052256 A1 | 4/2010 |
| EP | 0196967 A1 | 10/1986 |

(Continued)

*Primary Examiner* — Mark A Laurenzi
*Assistant Examiner* — Edward Bushard
(74) *Attorney, Agent, or Firm* — Geoffrey Brumbaugh; McCoy Russell LLP

(57) ABSTRACT

Methods and systems are provided for a swirl generating device upstream of a compressor including a method, a system, and an apparatus for actuating the swirl generating device, which is located in a ring-shaped duct, adjust a swirl of air flowing through the ring-shaped duct to the compressor in response to engine operating conditions.

17 Claims, 6 Drawing Sheets

(56) References Cited

FOREIGN PATENT DOCUMENTS

| FR | 2636681 A1 | * | 3/1990 | ............ | F04D 29/462 |
|----|------------|---|--------|--------------|-------------|
| GB | 549457 | * | 11/1941 | ............ | F04D 29/526 |
| WO | 2010112719 A1 | | 10/2010 | | |

* cited by examiner

RADIAL TURBOCHARGER COMPRISING A SWIRL GENERATOR

CROSS REFERENCE TO RELATED APPLICATION

The present application claims priority to German Patent Application No. 102016200918.4, filed on Jan. 22, 2016. The entire contents of the above-referenced application are hereby incorporated by reference in its entirety for all purposes.

FIELD

The present description relates generally to a compressor of an internal combustion engine.

BACKGROUND/SUMMARY

A supercharged internal combustion engine may be used as a motor vehicle drive unit. Within the context of the present disclosure, the expression "internal combustion engine" encompasses diesel engines and Otto-cycle engines and also hybrid internal combustion engines, which utilize a hybrid combustion process, and engines which may be used in hybrid drives which comprise not only the internal combustion engine but also an electric machine which can be connected in terms of drive to the internal combustion engine and which receives power from the internal combustion engine or which, as a switchable auxiliary drive, additionally outputs power.

Due to increasingly stringent emissions standards, it is sought to minimize fuel consumption and reduce pollutant emissions.

Fuel consumption may be inefficient in particular in the case of Otto-cycle engines that is to say in the case of spark-ignition internal combustion engines. The reason for this lies in the principle of the working process of the traditional Otto-cycle engine, in which the desired load or power is set by varying the charge of the combustion chamber, that is to say by means of quantity regulation. By adjusting a throttle flap which is provided in the intake system, the pressure of the inducted air downstream of the throttle flap can be reduced to a greater or lesser extent. For a constant combustion chamber volume, it is possible in this way for the air mass, that is to say the quantity, to be set by means of the pressure of the inducted air. However, quantity regulation by means of a throttle flap has thermodynamic disadvantages in the part-load range owing to the throttling losses.

One approach for dethrottling the Otto-cycle working process is to utilize direct fuel injection. The injection of fuel directly into the combustion chamber of the cylinder is considered to be a suitable measure for noticeably reducing fuel consumption even in Otto-cycle engines. The dethrottling of the internal combustion engine is realized by virtue of quality regulation being used within certain thresholds. By means of direct injection, it is thus possible to realize a stratified combustion chamber charge, which can contribute significantly to the dethrottling of the Otto-cycle working process because the internal combustion engine can be leaned to a very great extent by means of the stratified charge operation, which offers thermodynamic advantages in particular in part-load operation, that is to say in the lower and medium load range, when only small amounts of fuel are to be injected.

The use of an at least partially variable valve drive likewise offers the possibility of dethrottling. A further approach to a solution for dethrottling an Otto-cycle engine is offered by cylinder deactivation, that is to say the deactivation of individual cylinders in certain load ranges. The efficiency in part-load operation can be improved, that is to say increased, by means of a partial deactivation because the deactivation of one cylinder of a multi-cylinder internal combustion engine increases the load on the other cylinders, which remain in operation, if the engine power remains constant, such that the throttle flap may be opened further to introduce a greater air mass into said cylinders, whereby dethrottling of the internal combustion engine is attained overall. During the partial deactivation, the cylinders which are permanently in operation furthermore operate in the region of higher loads, at which the specific fuel consumption is lower. The load collective is shifted toward higher loads.

A further measure for improving the efficiency of an internal combustion engine and/or for reducing the fuel consumption comprises in supercharging of the internal combustion engine, wherein supercharging is primarily a method of increasing power, in which the air demanded for the combustion process in the engine is compressed, whereby a greater mass of air can be supplied to each cylinder per working cycle. In this way, the fuel mass and therefore the mean pressure can be increased.

Supercharging is a suitable means for increasing the power of an internal combustion engine while maintaining an unchanged swept volume, or for reducing the swept volume while maintaining the same power. In any case, supercharging leads to an increase in volumetric power output and a more expedient power-to-weight ratio. If the swept volume is reduced, it is thus possible to shift the load collective toward higher loads, at which the specific fuel consumption is lower. By means of supercharging in combination with a suitable transmission configuration, it is also possible to realize so-called downspeeding, with which it is likewise possible to achieve a lower specific fuel consumption.

Supercharging consequently assists in the development of internal combustion engines to minimize fuel consumption, that is to say to improve the efficiency of the internal combustion engine.

For supercharging, use is often made of an exhaust-gas turbocharger, in which a compressor and a turbine are arranged on the same shaft. The hot exhaust-gas flow is fed to the turbine and expands in the turbine with a release of energy, as a result of which the shaft is set in rotation. The energy supplied by the exhaust-gas flow to the turbine and ultimately to the shaft is used for driving the compressor which is likewise arranged on the shaft. The compressor conveys and compresses the charge air fed to it, as a result of which supercharging of the cylinders is obtained. A charge-air cooler is advantageously provided in the intake system downstream of the compressor, by means of which charge-air cooler the compressed charge air is cooled before it enters the at least one cylinder. The cooler lowers the temperature and thereby increases the density of the charge air, such that the cooler also contributes to improved charging of the cylinders, that is to say to a greater air mass. Compression by cooling takes place.

The advantage of an exhaust-gas turbocharger in relation to a mechanical supercharger consists in that an exhaust-gas turbocharger utilizes the exhaust-gas energy of the hot exhaust gases, whereas a mechanical supercharger draws the energy desired for driving it directly or indirectly from the internal combustion engine. In general, a mechanical or kinematic connection is used for the transmission of power between the supercharger and the internal combustion engine.

The advantage of a mechanical supercharger in relation to an exhaust-gas turbocharger consists in that the mechanical supercharger generates, and makes available, the desired charge pressure at all times, specifically regardless of the operating state of the internal combustion engine, in particular regardless of the present rotational speed of the crankshaft. This applies in particular to a mechanical supercharger which can be driven by way of an electric machine.

Difficulties may be encountered in achieving an increase in power in all engine speed ranges by means of exhaust-gas turbocharging. A relatively severe torque drop is observed in the event of a certain engine speed being undershot. Said torque drop is understandable if one takes into consideration that the charge pressure ratio is dependent on the turbine pressure ratio. If the engine speed is reduced, this leads to a smaller exhaust-gas mass flow and therefore to a lower turbine pressure ratio. Consequently, toward lower engine speeds, the charge pressure ratio likewise decreases. This equates to a torque drop.

One such measure, for example, is a small design of the turbine cross section and simultaneous provision of an exhaust-gas blow-off facility. Such a turbine is also referred to as a wastegate turbine. If the exhaust-gas mass flow exceeds a threshold value, a part of the exhaust-gas flow is, within the course of the so-called exhaust-gas blow-off, conducted via a bypass line past the turbine. This approach has the disadvantage that the supercharging behavior is inadequate at relatively high rotational speeds or in the case of relatively high exhaust-gas quantities.

The torque characteristic may also be improved by means of multiple turbochargers arranged in parallel, that is to say by means of multiple turbines of relatively small turbine cross section arranged in parallel, wherein turbines are activated successively with increasing exhaust-gas flow rate.

The torque characteristic of a supercharged internal combustion engine may furthermore be advantageously influenced by means of a plurality of exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows, which considerably improves the torque characteristic in the lower engine speed range. This is achieved by designing the high-pressure turbine for small exhaust-gas mass flows and by providing a bypass line by means of which, with increasing exhaust-gas mass flow, an increasing exhaust-gas flow rate is conducted past the high-pressure turbine.

The shifting of the surge limit toward smaller compressor flows is of major significance in the case of supercharged internal combustion engines because it is sought, even in the presence of low charge-air flow rates, to provide charge pressures high enough to thereby realize a satisfactory torque characteristic of the internal combustion engine even at low engine speeds.

In principle, the flow velocity c of the charge air in the intake system decreases significantly in the presence of low charge-air flow rates. According to previous attempts, the approaching-flow velocity, w, relative to the at least one impeller, which rotates at a circumferential velocity, u, is impaired to such an extent that a pressure increase by way of diversion of the charge-air flow as it flows through the impeller can be realized only to an extent, or not at all. Rather, the charge-air flow separates from the impeller blades, a partial backward flow occurs, and the compressor begins to surge.

In one example, the issues described above, as recognized by the inventors herein, may be addressed by a supercharged internal combustion engine having an intake system configured to supply charge air, an exhaust-gas discharge system configured to discharge exhaust gas, and a compressor arranged in the intake system comprising at least one impeller which is arranged on a rotatable shaft in a compressor housing and is equipped with impeller blades, and where the intake system has, upstream of the at least one impeller, a section which runs transversely with respect to a virtual elongation of the shaft of the compressor and in which a pivotable flap is arranged, said section splitting, at least on the side facing away from the at least one impeller, into arcuate ducts which merge so as to form a ring-shaped duct which is of open form on the side facing toward the at least one impeller. In this way, these design measures serve—in particular in the presence of low charge-air flow rates—to advantageously influence the approaching flow to the at least one rotating impeller, and thereby improve the supercharging behavior of the internal combustion engine.

The compressor of the internal combustion engine according to the present disclosure may be a mechanical charger, or else may be the compressor of an exhaust-gas turbocharger.

The internal combustion engine according to the present disclosure comprises, at the inlet side, a pivotable flap which serves for the generation of at least one swirl and which, for this purpose, is arranged, upstream of the at least one impeller, in a section of the intake system which runs transversely with respect to a virtual elongation of the shaft of the compressor.

Said section of the intake system opens into a ring-shaped duct, the arcuate ducts of which run with opposite curvature, preferably extend around the virtual elongation of the compressor shaft, and merge on the side facing away from the section.

The ring-shaped duct is of open form on one side, that is to say on the side facing toward the at least one impeller, wherein the charge air supplied to the ring-shaped duct by the intake system or via the section is supplied to the at least one impeller from the ring-shaped duct via an inlet region of the compressor.

The flap allows charge air to flow past on both sides of the flap, such that it is possible for charge air to be introduced both into one arcuate duct of the ring-shaped duct and into the other arcuate duct of the ring-shaped duct. The charge-air flows conducted through the two ducts have a differently oriented swirl, specifically, on the one hand, a clockwise swirl and, on the other hand, a counterclockwise swirl, or, on the one hand, a swirl in the direction of rotation of the at least one impeller, and on the other hand, a swirl counter to the direction of rotation of the at least one impeller.

By way of suitable pivoting of the flap, the distribution of the charge air between the two arcuate ducts is influenced. That is to say, the charge air can be divided into charge-air flows of different magnitude. Charge-air flows of different magnitude are then conducted to the two ducts of the ring-shaped duct.

One charge-air flow, with its swirl, influences the other charge-air flow, with its differently oriented swirl, and vice versa, that is to say the two charge-air flows of the two arcuate ducts, with differently oriented swirl, influence one another. In particular, the swirl of one charge-air flow diminishes the swirl of the respective other charge-air flow. In this respect, by way of corresponding pivoting of the flap, it is possible to influence not only the orientation of the swirl of the charge-air flow supplied to the at least one impeller, but also the intensity or the extent of said swirl.

The charge-air flow that enters the at least one impeller can thus have imparted to it a velocity component, oriented tangentially with respect to the impeller or with respect to the shaft of the compressor, of different magnitude.

The approaching flow to the at least one rotating impeller is thereby significantly improved, because the absolute velocity, c, of the approaching charge-air flow is rotated relative to the shaft of the compressor such that, in combination with the circumferential velocity, u, of the at least one rotating impeller, a more effectively utilizable relative approaching-flow velocity, w, of the charge air relative to the rotating impeller blades is realized.

The nature and extent of the rotation of the absolute velocity, c, of the approaching charge-air flow relative to the shaft of the compressor can be influenced by pivoting of the flap.

It is possible to dispense with a complex guide device for influencing the approaching flow, which, for example, forcibly imparts a swirl, that is to say a velocity component transversely with respect to the shaft of the compressor or in the circumferential direction, to the charge-air flow. Along with the guide device, the costs for the generally adjustable guide device, and the control thereof, are also eliminated. The problem whereby a guide device provided in the intake system constitutes merely an undesired flow resistance, and reduces the pressure in the charge-air flow, in particular in the presence of high engine speeds or high charge-air flow rates, is likewise eliminated. Dense packaging of the compressor unit as a whole is thus made possible.

An object on which the present disclosure may be based is achieved by means of the internal combustion engine according to the present disclosure, that is to say a supercharged internal combustion engine according to the preamble of claim 1 is provided, the supercharging behavior of which in the presence of low charge-air flow rates is improved.

Embodiments are advantageous in which the flap is pivotable such that all of the charge air can be supplied to substantially only one of the two ducts of the ring-shaped duct. It is preferably possible for all of the charge air to be supplied either to one duct or to the other duct of the ring-shaped duct. The latter makes it possible to realize an intense swirl, specifically both in one direction of rotation and in the other direction of rotation.

The design measures proposed according to the present disclosure are not only suitable for shifting the surge limit toward lower charge-air flow rates and thus for improving the supercharging behavior of the internal combustion engine in the presence of low charge-air flow rates.

By optimizing the approaching-flow conditions of the at least one impeller, the efficiency of the compressor can be fundamentally improved, and thus the supercharging behavior of the internal combustion engine can be improved under all operating conditions, in particular also in the presence of medium and relatively high charge-air flow rates.

Embodiments of the supercharged internal combustion engine are advantageous in which the section intersects the virtual elongation of the shaft of the compressor.

Embodiments of the supercharged internal combustion engine are advantageous in which the section runs perpendicular to the virtual elongation of the shaft of the compressor.

The two above embodiments relate to the arrangement or the orientation of the relevant section in the intake system in which the pivotable flap is arranged.

The embodiments facilitate the formation of a ring-shaped duct which runs coaxially with respect to the impeller or with respect to the virtual elongation of the shaft. Thus, the formation of a swirling flow, that is to say an approaching charge-air flow with swirl, is simplified.

Here, embodiments of the supercharged internal combustion engine are advantageous in which the pivotable flap is arranged substantially centrally in the section, such that charge air can be conducted past on both sides of the flap.

The central arrangement of the flap allows charge air to flow past on both sides of the flap, and thus may split up the charge air between the two arcuate ducts of the ring-shaped duct and form charge-air flows with differently oriented swirl. By way of suitable pivoting of the flap, the charge air is split up between the two ducts, or charge-air flows of different magnitude with differently oriented swirl are generated.

Embodiments of the supercharged internal combustion engine are also advantageous in which the flap is pivotable about an axis which runs substantially parallel to the shaft of the compressor. This embodiment facilitates the formation of a swirling flow which runs coaxially with respect to the shaft of the compressor impeller, that is to say an approaching charge-air flow with a swirl around the virtual elongation of the shaft.

Embodiments of the supercharged internal combustion engine are advantageous in which the ring-shaped duct is, at least in sections, of circular form. Said at least partially circular form of the ring-shaped duct advantageously corresponds to the circular form of the at least one rotating impeller. An at least partially rotationally symmetrical form of the ring-shaped duct is suited to the rotation of the at least one impeller. Here, the ring-shaped duct is responsible for at least the generation of the swirl or of the charge-air flow with swirl.

For the stated reasons, embodiments of the supercharged internal combustion engine are also advantageous in which the ring-shaped duct runs around the virtual elongation of the shaft of the compressor.

Embodiments of the supercharged internal combustion engine are advantageous in which the ring-shaped duct is arranged spaced apart from the at least one impeller.

Embodiments of the supercharged internal combustion engine are advantageous in which an inlet region of the compressor is arranged between the ring-shaped duct and the at least one impeller.

In this context, embodiments of the supercharged internal combustion engine are advantageous in which the inlet region runs and is configured coaxially with respect to the shaft of the compressor, such that the charge air can also be supplied to the compressor impeller substantially axially. The charge air then does not have to be deflected while flowing through the inlet region, in order to be fed axially to the compressor. Since a deflection or directional change of the charge air flow is absent in the inlet region, unnecessary pressure losses in the charge air flow as a consequence of flow deflection are avoided. The degree of efficiency and the charge pressure ratio can be increased.

Embodiments of the supercharged internal combustion engine are advantageous in which a throttle device is arranged in the intake system downstream of the compressor.

It may be expedient for a throttle device to be provided in the intake system in order, in the context of quantity regulation, to be able to adjust the load in wide ranges, in particular in the presence of very low charge-air flow rates, or in order to be able to shut off the supply of air to the cylinders.

In this context, embodiments of the supercharged internal combustion engine are advantageous in which the throttle device is a throttle flap.

Embodiments of the supercharged internal combustion engine are advantageous in which a charge-air cooler is arranged in the intake system downstream of the compressor. The temperature of the charge air is reduced by way of cooling and the density is increased in this way. Compression by cooling takes place. In this way, the cooler contributes to improved charging of the cylinders.

Embodiments of the supercharged internal combustion engine are advantageous in which the compressor is an axial compressor, in which the exit flow runs substantially axially. In the context of the present disclosure, "substantially axially" means that the speed component in the axial direction is greater than the radial speed component.

Embodiments of the supercharged internal combustion engine are likewise advantageous in which the compressor is a radial compressor. This embodiment offers advantages in particular with regard to dense packaging if the at least one compressor is the compressor of an exhaust-gas turbocharger. The compressor housing may be configured as a spiral or worm housing.

Embodiments of the supercharged internal combustion engine are advantageous in which an exhaust-gas turbocharger is provided which comprises a turbine arranged in the exhaust-gas discharge system and a compressor arranged in the intake system, the turbine and the compressor being arranged on the same rotatable shaft.

In this context, embodiments of the supercharged internal combustion engine may be advantageous in which the compressor is the compressor of the exhaust-gas turbocharger.

Embodiments of the supercharged internal combustion engine may also be advantageous in which the compressor is a mechanical charger.

Embodiments of the supercharged internal combustion engine are advantageous in which an exhaust-gas recirculation arrangement is provided.

In this context, embodiments of the supercharged internal combustion engine are advantageous in which an exhaust-gas recirculation arrangement is provided which comprises a line which opens into the intake system downstream of the compressor.

To adhere to future threshold values for nitrogen oxide emissions, use may be made of exhaust-gas recirculation, that is to say a recirculation of exhaust gases from the exhaust-gas discharge system into the intake system, wherein the nitrogen oxide emissions can be lowered considerably with increasing recirculation rate.

Here, embodiments are advantageous in which a cooler is provided in the line to the exhaust-gas recirculation arrangement, which cooler lowers the temperature in the hot exhaust-gas flow and thus increases the density of the exhaust gases. The temperature of the cylinder fresh charge which results upon the mixing of the fresh air with the recirculated exhaust gases is reduced in this way, as a result of which said cooler also contributes to improved charging of the combustion chamber with charge air.

Embodiments are advantageous in which a shut-off element is provided in the line for exhaust-gas recirculation. Said shut-off element serves for the control of the exhaust-gas recirculation rate.

Another object on which the present disclosure may be based, specifically that of specifying a method for operating a supercharged internal combustion engine of a type described above, is achieved by way of a method wherein the flap arranged in the intake system upstream of the at least one impeller is pivoted to influence an approaching-flow angle $\alpha$ of the charge air supplied to the compressor relative to the impeller blades of the at least one impeller.

That which has already been stated with regard to the internal combustion engine according to the present disclosure also applies to the method according to the present disclosure, for which reason reference is generally made at this juncture to the statements made above with regard to the internal combustion engine according to the present disclosure. The different internal combustion engines demand, in part, different method variants.

Embodiments of the method are advantageous in which the charge air supplied to the less-flow angle $\alpha$ is improved.

The flap imparts a velocity component oriented tangentially with respect to the impeller or with respect to the shaft of the compressor, that is to say a swirl, to the charge-air flow entering the impeller, whereby the compressor can compress even relatively low charge-air flow rates without the risk of surging.

Here, embodiments of the method are advantageous in which the charge air supplied to the compressor has a swirl forcibly imparted to it using the flap when the engine speed of the internal combustion engine $n_{mot}$ falls below a predefinable engine speed.

The charge-air flow rate basically increases with the engine speed $n_{mot}$. In a traditional Otto-cycle engine with quantity regulation, the charge-air flow rate increases with increasing load even at a constant engine speed, whereas in a traditional diesel engine with quality regulation, the charge-air flow rate is, as a first approximation, dependent merely on engine speed, because in the event of a load shift at constant engine speed, the mixture composition but not the mixture quantity is varied.

The internal combustion engine according to the present disclosure is a supercharged internal combustion engine, such that consideration may also be given to the charge pressure on the intake side, which may vary with the load and/or the engine speed and which has an influence on the charge-air flow rate. The relationships discussed above regarding the charge-air flow rate and the load or engine speed consequently apply only conditionally in this general form. It may therefore be advantageous for consideration to be given primarily on the charge-air flow rate and not directly to the engine speed.

Embodiments of the method are advantageous in which the charge air supplied to the compressor has a swirl forcibly imparted to it using the flap when the load of the internal combustion engine $T_{mot}$ falls below a predefinable load. In the case of quantity regulation, the charge-air flow rate increases with increasing load, even in the case of a constant engine speed.

It should be understood that the summary above is provided to introduce in simplified form a selection of concepts

BRIEF DESCRIPTION OF THE DRAWINGS

FIGS. 3-4 are shown approximately to scale.

DETAILED DESCRIPTION

Figure 1A:
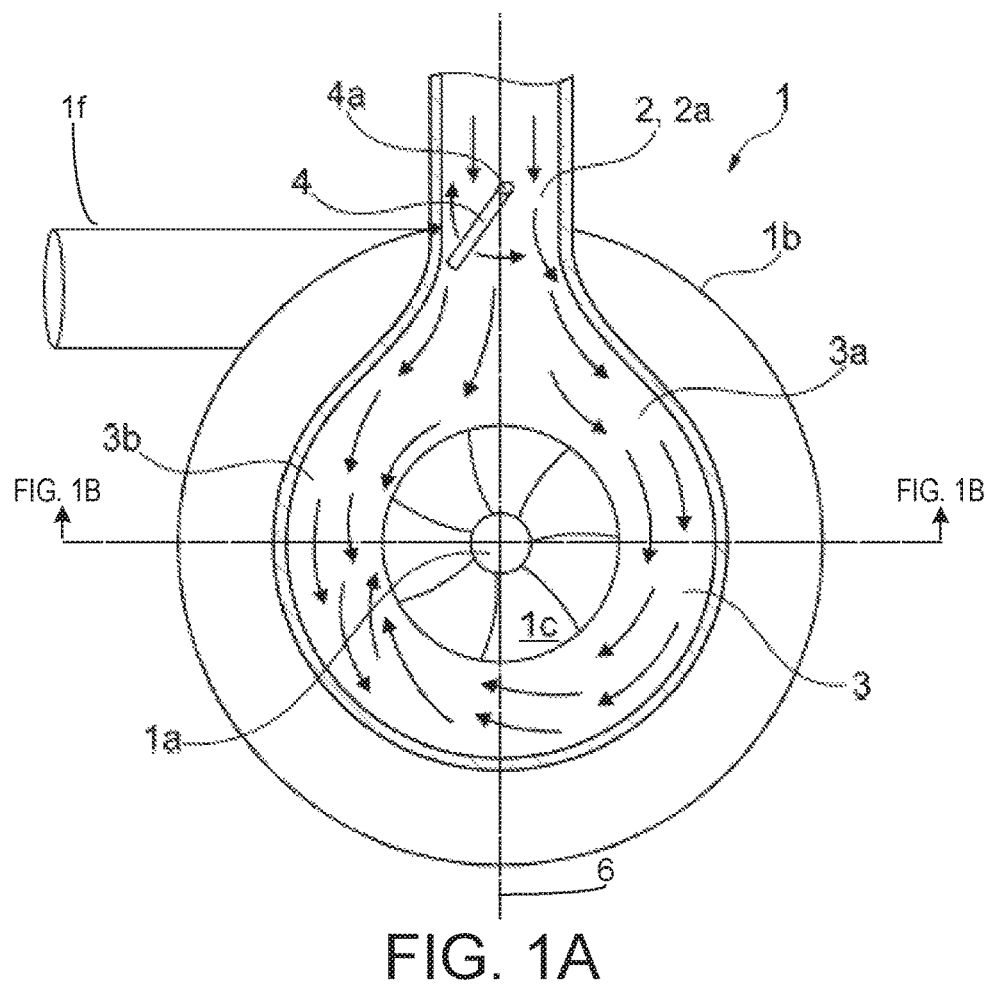
FIG. 1A schematically shows the compressor, arranged in the intake system, of a first embodiment of the internal combustion engine, partially in section and in a view in the direction of the compressor shaft.

The following description relates to systems and methods for increasing or decreasing a swirl of charge air flow delivered to a compressor. A rotatable flap is arranged in a duct upstream of a compressor, as shown in FIG. 1A. The rotatable flap is located in an inlet pipe of the duct, where the flap may obstruct charge air flow to the duct. Based on a position of the flap, the flap may impart a swirl onto incoming charge air flow. Alternatively, for other positions of the flap, the flap may reduce a swirl of incoming charge air flow. A method for adjusting a position of the flap is described in FIG. 6.

Figure 1B:
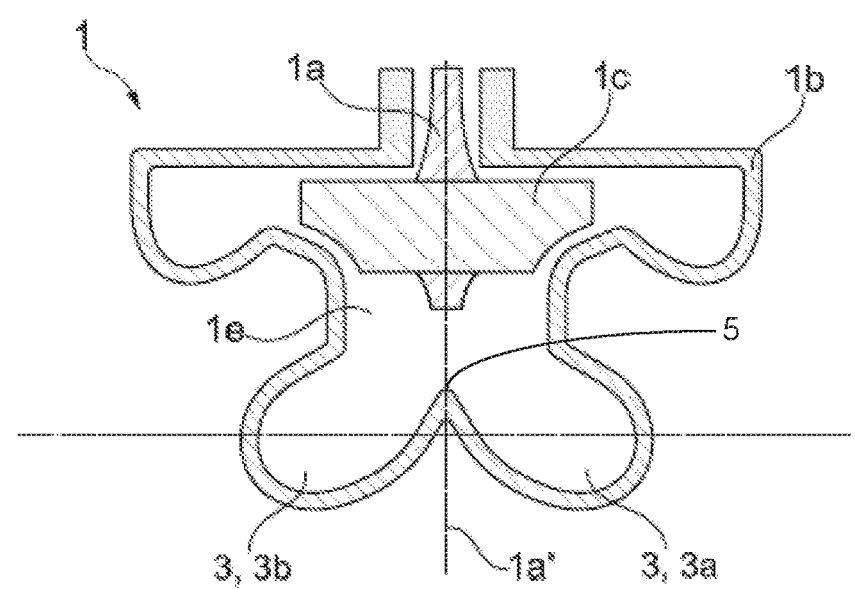
FIG. 1B schematically shows the compressor illustrated in FIG. 1A, rotated through 90° and sectioned along the compressor shaft.
Figure 3:
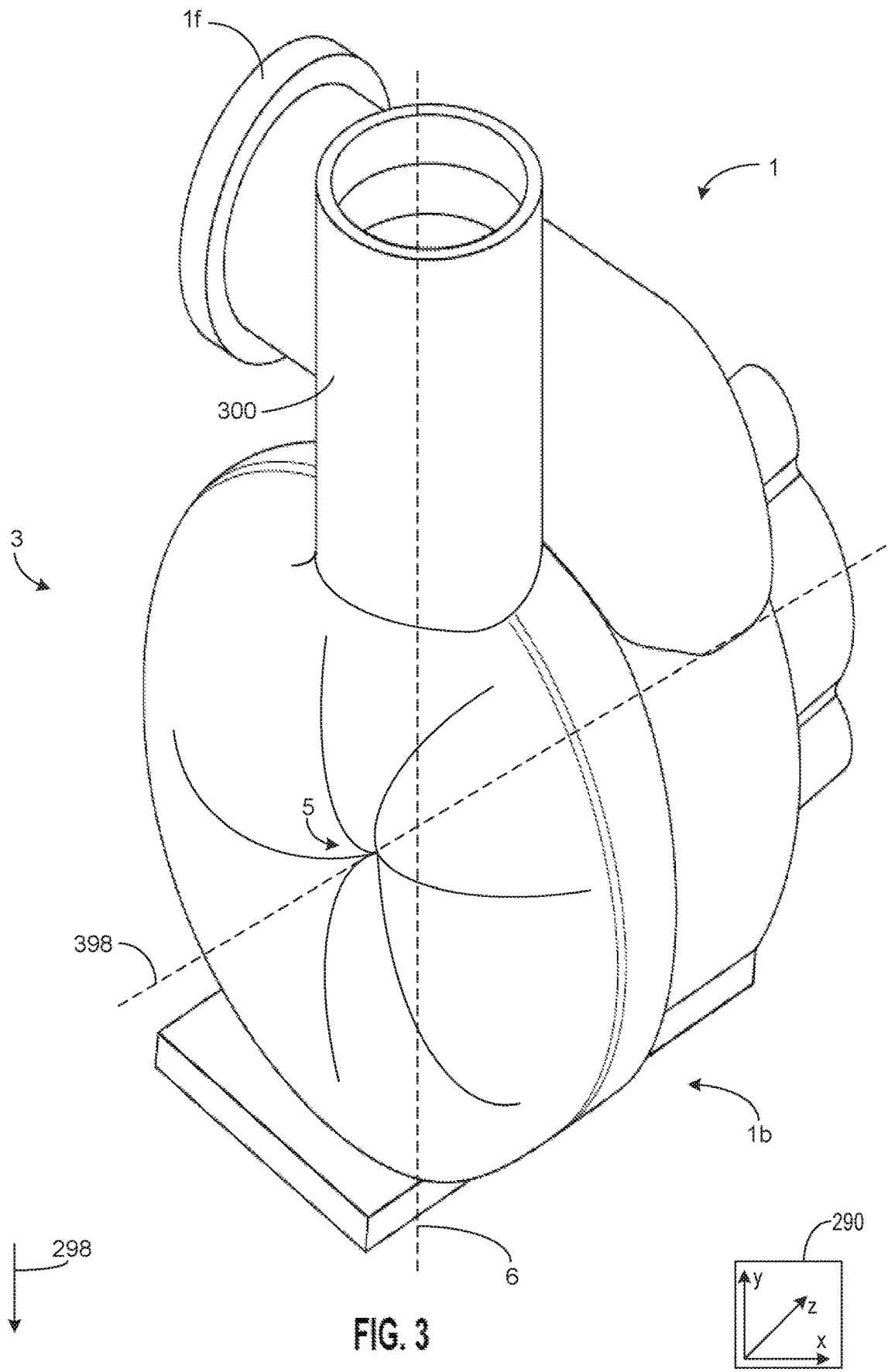
FIG. 3 shows a first orientation of the compressor.
Figure 4:
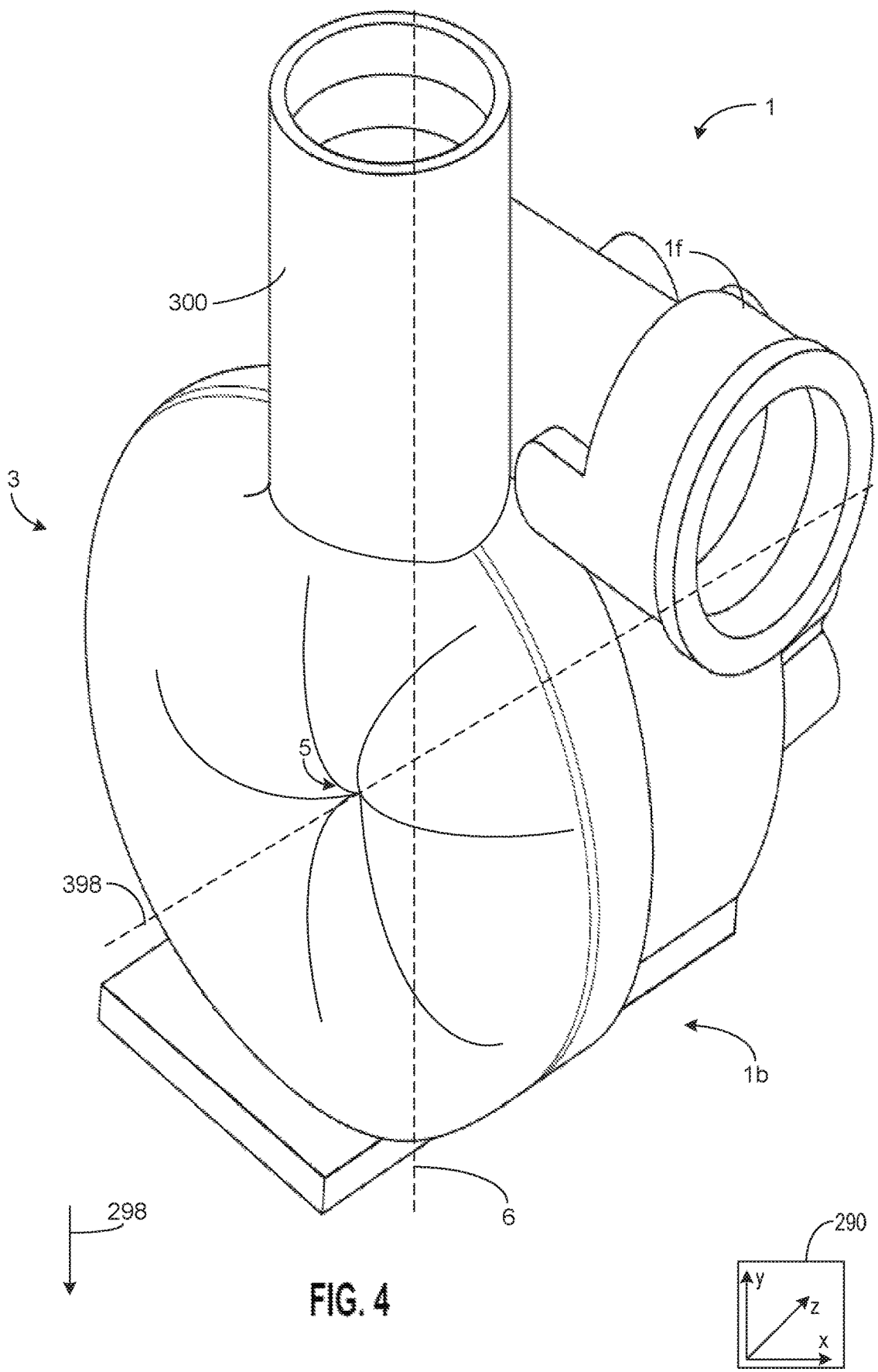
FIG. 4 shows a second orientation of the compressor.

The duct is a toroid shape with no opening along an outer surface distal to the compressor, as shown in FIGS. 1B, 3, and 4. As such, the inlet pipe extends toward the duct in a direction perpendicular to a shaft of the compressor before bifurcating to create the substantially toroid-shaped duct. The duct is open on a side proximal to the compressor, which fluidly couples the duct to an impeller of the compressor.

Figure 2A:
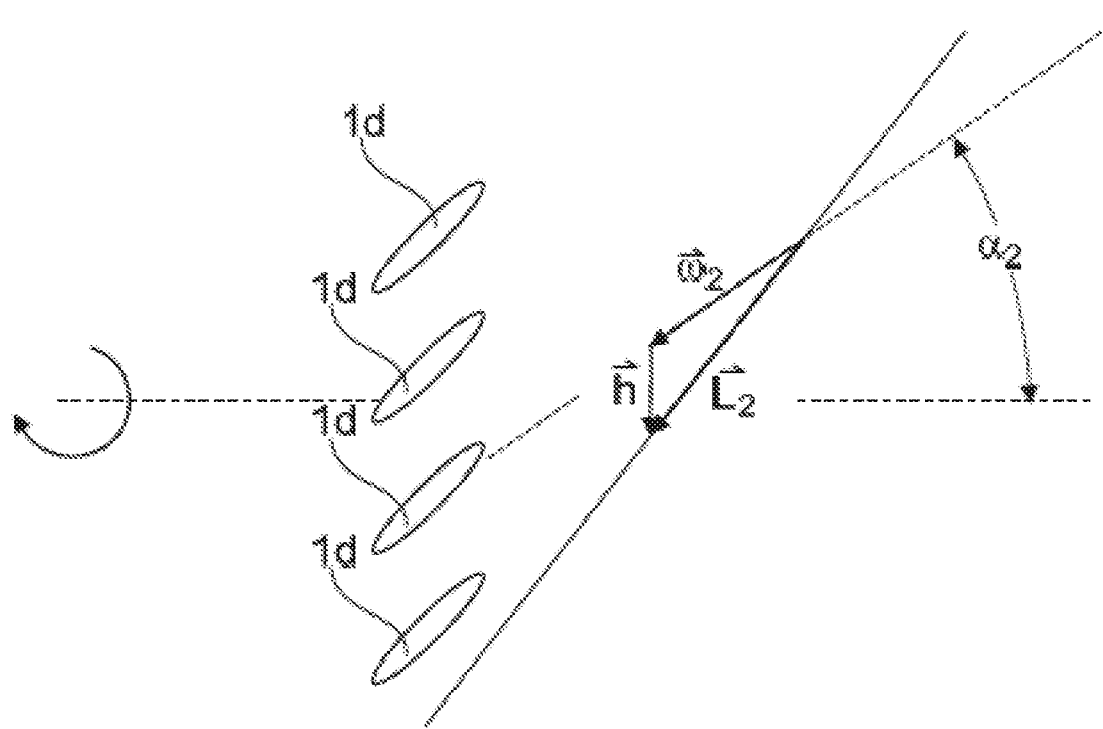
FIG. 2A schematically shows the impeller blades of the compressor illustrated in FIGS. 1A and 1B, in a developed view, together with the velocity triangle of a swirling approaching flow.
Figure 2B:
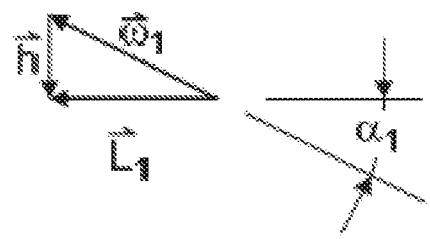
FIG. 2B shows the velocity triangle of FIG. 2A in the case of a swirl-free approaching flow.
Figure 5:
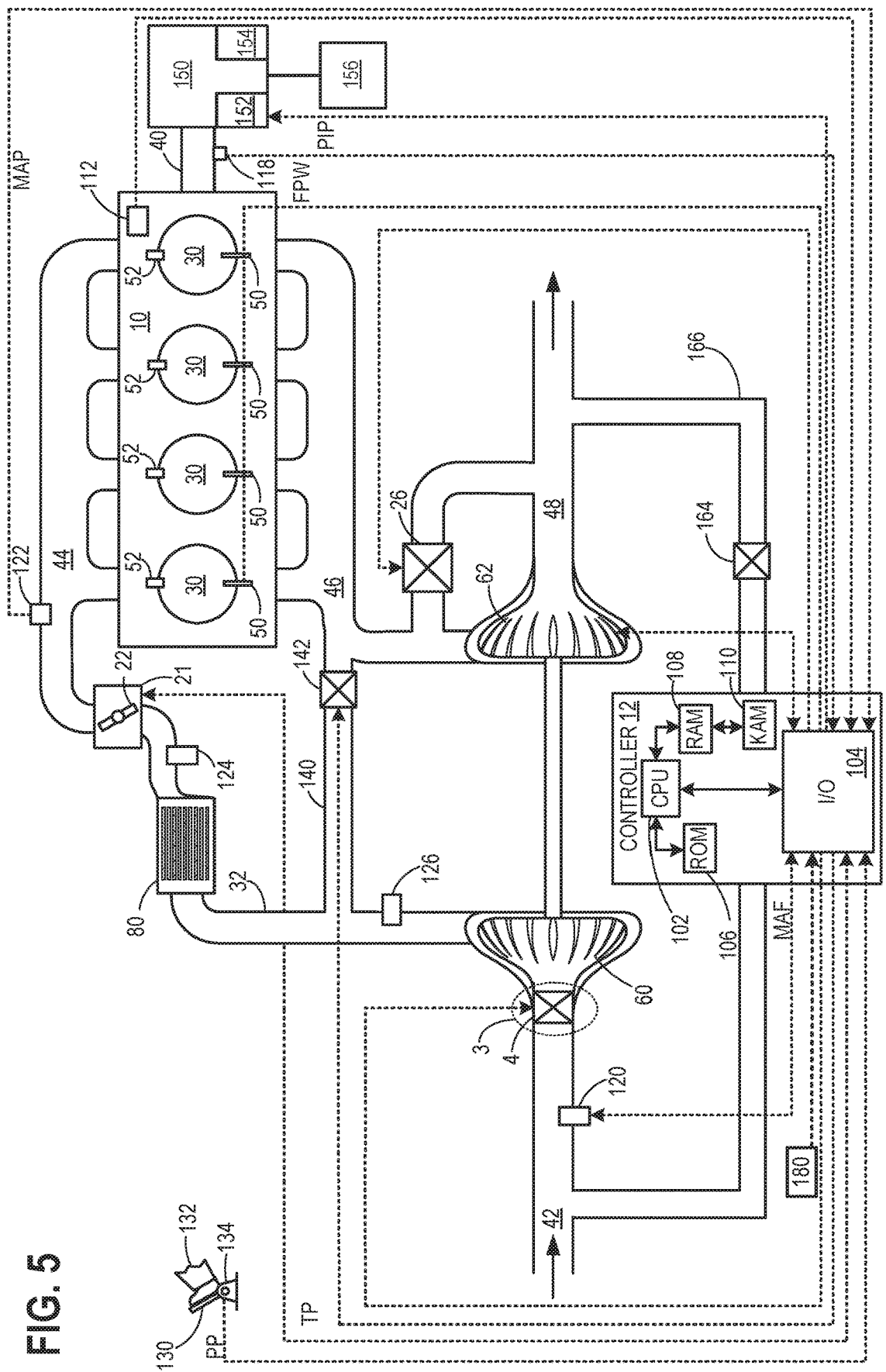
FIG. 5 shows a turbocharged engine.

The compressor is configured to provide boost air to an engine, as shown in FIG. 5. The flap is adjusted based on one or more engine operating conditions. As such, an angle of the flap, relative to the impeller is adjusted based on the one or more engine operating conditions. The angle of the flap is shown in FIGS. 2A and 2B.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1A schematically shows the compressor 1, arranged in the intake system 2, of a first embodiment of the internal combustion engine, partially in section and in a view in the direction of the compressor shaft 1a. FIG. 1B shows the compressor 1 illustrated in FIG. 1A, rotated through 90° and sectioned along the compressor shaft 1a.

The compressor 1 is arranged in the intake system 2 of the internal combustion engine and has an impeller 1c which is arranged on a rotatable shaft 1a in a compressor housing 1b and is equipped with impeller blades.

The intake system 2 upstream of the impeller 1c has a section 2a which, in the present case, runs perpendicular to a virtual elongation of the shaft 1a of the compressor 1 and which intersects said virtual elongation at a distance from the impeller 1c. The virtual elongation extends from the shaft in a direction parallel to the shaft 1a toward a viewer.

Arranged centrally in the section 2a of the intake system 2 there is a pivotable flap 4 which is pivotable about an axle 4a which runs parallel to the shaft 1a of the compressor 1, such that charge air can be conducted past on both sides of the flap 4. The flap 4 pivots about the axle 4a such that an angle created between the flap 4 and a direction of charge air flow into the section 2a (parallel to vertical axis 6) is adjusted. In one example, the flap 4 may rotate 90° degrees, with ±45° corresponding to extreme positions of the flap 4. In the position shown, the flap 4 is in a −45° position. As shown, a compressor outlet pipe if is perpendicular to the vertical axis 6 and to the direction of charge air flow entering the section 2a.

The section 2a splits into arcuate ducts 3a, 3b which merge so as to form a ring-shaped duct 3. The ring-shaped duct 3 running around the virtual elongation of the shaft 1a of the compressor 1 is circular, and is of open form on the side facing toward the impeller 1c. That is to say, at least a portion of the ring-shaped duct 3 is fluidly coupled to at least a portion of the impeller 1c.

The compressor 1 has an inlet region 1e which is arranged between the ring-shaped duct 3 and the impeller 1c and which runs coaxially with respect to the shaft 1a of the compressor 1, such that the charge air is supplied to the compressor 1 axially without the use of further measures. The inlet region 1e and the ring-shaped duct 3 are, in the present case, formed integrally with the rest of the compressor housing 1b. As shown, the section 2a of the compressor housing comprises an indentation 5 pointing in a direction toward the impeller 1c. As shown, the indentation 5 is aligned with the shaft 1a along a common axis and/or virtual elongation of the shaft. In this way, the section 2a appears concave with a depression (e.g., indentation 5) along its outer surface distal to the impeller 1c.

The section 2a narrows as it transitions from the indentation 5 to the inlet region 1e. That is to say, a diameter of the ring-shaped duct 3 decreases as the passages nears the inlet region 1e such that diameters of the inlet region 1e and the ring-shaped duct 3 are substantially equal where the inlet region 1e and the ring-shaped duct 3 meet.

In some embodiments, additionally or alternatively, the ring-shaped duct 3 is a toroid-shaped duct closed at an end distal to and/or furthest away from the compressor 1. Along the cross-sectional plane taken for FIG. 1B, the duct 3 is substantially B-shaped. The end further comprises an indentation 5 and/or projection 5 extending toward the inlet region 1e. As such, when charge air flows past the flap 4, the charge air may further flow around the indentation 5 and/or projection 5, through the first arcuate duct 3a and the second arcuate duct 3b, and merge at the inlet region 1e before flowing to the impeller 1c. In this way, charge air flows along a circular path symmetrically spaced about an axis extending from and parallel to the shaft 1a before entering the inlet region 1e.

By way of suitable pivoting of the flap 4, the distribution of the charge air between the two arcuate ducts 3a, 3b is influenced, that is to say the charge air is divided into charge-air flows of different magnitude. As shown, the flap 4 pivots about the point 4a, such that an end of the flap 4 opposite the point 4a may come into contact with interior surfaces of the section 2a. This may obstruct charge air flow to either the first arcuate duct 3a or the second arcuate duct 3b. In the position shown, charge air flow to the second arcuate duct 3b is obstructed and/or impeded. It will be appreciated that a similar position of the flap 4 is realized for the first arcuate duct 3a.

The two charge-air flows are charge-air flows with differently oriented swirl, which may influence one another. In one example, the influence is destructive and swirl decreases following merging of the two charge-air flows. Additionally or alternatively, the influence is constructive and swirl increases following merging of the two charge-air flows. In some examples, actuation of the flap 4 may alter the influence the charge-air flows impart onto one another. For example, a less angled position of the flap 4 may promote constructive influence and a more angled position may promote destructive influence. In FIG. 1A, the charge-air flow in the right-hand duct 3a has the greater charge-air flow rate due to the off-set positioning of the flap 4. That is to say, the flap 4 obstructs a greater portion of a passage leading to the left-hand duct 3b than the right-hand duct 3a. The charge-air flow supplied to the impeller 1c thus has a correspondingly oriented swirl imparted to it.

In the example of FIG. 1A, the position of the flap 4 may impart a greater swirl to charge air flowing to the second arcuate duct 3b than charge air flowing to the first arcuate duct 3a. As such, when charge air from the arcuate ducts merges, turbulence and/or swirl may be averaged between the two. That is to say, swirl and/or turbulence of charge air from the second arcuate duct 3b decreases and swirl and/or turbulence of charge air from the first arcuate duct 3a increases. As described above, the merging of charge air from the two arcuate ducts may be constructive such that swirl is further increased. This may be utilized at lower engine loads where compressor surge is more likely to occur.

The absolute velocity c of the approaching charge-air flow is rotated relative to the shaft 1a of the compressor 1, specifically such that, in combination with the circumferential velocity u of the impeller 1c or of the impeller blades 1d, an improved relative approaching-flow velocity w of the charge air relative to the rotating impeller blades 1d is realized. The nature and extent of the rotation of the absolute velocity c of the approaching charge-air flow relative to the shaft 1a of the compressor 1 can be influenced by pivoting of the flap 4.

FIG. 2A schematically shows the rotating impeller blades 1d of the compressor 1 illustrated in FIGS. 1A and 1B, in a developed view, together with the velocity triangle $c_2$, $w_2$, u of the swirling approaching flow. FIG. 2B illustrates the associated velocity triangle $c_1$, $w_1$, u of a swirl-free approaching flow. The different flow conditions are evident from the velocity vectors.

Turning now to FIGS. 3 and 4, they show embodiments of the compressor 1 comprising the ring-shaped duct 3 described above. However, FIGS. 3 and 4 differ in an orientation and/or direction of a compressor outlet if leading to an intake manifold of an engine. The FIGS. 3 and 4 are described in conjunction herein. Components previously introduced are similarly numbered in subsequent figures and may not be reintroduced for reasons of brevity.

As shown, FIGS. 3 and 4 comprise an axis system 290 comprising three axes, namely, an x-axis in the horizontal direction, a y-axis in the vertical direction, and a z-axis a direction orthogonal to both the x- and y-axes. As such, a portion of an inlet pipe 300 leading to the ring-shaped duct 3 is parallel to the y-axis. Furthermore, a shaft (e.g., shaft 1a of FIG. 1A) of the compressor 1 is parallel to the x-axis. Lastly, the compressor outlet if is parallel to a negative z-direction and the compressor outlet if of FIG. 4 is parallel to a positive z-direction. As such, each of the inlet pipe 300, compressor outlet 1f, and the shaft (e.g., shaft 1a of FIGS. 1A and 1B) are orthogonal (e.g., perpendicular) to one another. Central axis 398 is parallel to the x-axis and passes through geometric centers of the ring-shaped duct 3 and the compressor 1. In one example, central axis 398 represents a virtual elongation of the shaft (e.g., shaft 1a). Thus, the central axis 398 passes through the shaft. Arrow 298 represents a direction of gravity.

Charge air enters the duct 3 via the inlet pipe 300 and flows through one or more of the left- and right-handed ducts around the indentation 5 and/or projection 5 based on a position of the flap, which are obstructed in the illustrations of FIGS. 3 and 4 due to compressor housing 1b. As described above, the flap (e.g., flap 4 of FIG. 1A) is pivotable in the inlet pipe 300 along an axle (e.g., axle 4a of FIG. 1A). The flap pivots between two extreme positions configured to alter charge air flow into the duct 3. In one example, the flap is stationary after being actuated to a desired position. Alternatively, the flap may oscillate between two or more desired positions. As described above, an angle of the flap is measured relative to a direction of incoming charge air flow which is parallel to the y-axis. In one example, adjusting the flap to an angled position, which at least partially obstructs charge air flow into the duct is in response to one or more engine operating parameters (e.g., low load, high altitude, etc.).

As shown, the duct 3 is completely housed within the compressor housing 1b. Thus, the duct 3 may be integrally cast into the compressor housing 1b. Alternatively, the duct 3 may be a separate piece, coupled to the compressor housing 1b. In one example, screws, welds, adhesives, fusions, and/or other coupling elements may be used to mate the duct 3 and compressor housing 1b together.

Intake air and/or charge air enters the ring-shaped duct 3 via the inlet pipe 300 along the y-axis in a direction parallel to gravity (arrow 298). The flap (e.g., flap 4 of FIGS. 1A and 1B) located near a bifurcation of the duct 3 near the inlet pipe 300 modifies a directionality and swirl of charge air flowing into the arcuate ducts of the duct 3. As such, the flap adjusts an amount of air flowing into each of the arcuate ducts, which are symmetrically spaced about the central axis 398 and indentation 5 and/or protrusion 5. In this way, air flow through duct 3 is around the central axis 398 (e.g., virtual elongation) before turning in a direction substantially parallel to the virtual elongation and x-axis toward an impeller (e.g., impeller 1c of FIGS. 1A and 1B). Said another way, charge air initially flows in a direction parallel to the y-axis, flows along a circular path of the duct 3 in a plane parallel to the y-axis, and turns in a direction parallel to the x-axis as it exits the duct 3 and flows to the compressor 1. The compressor compresses the charge air before directing the compressed charge air through the compressor outlet 1f in a direction parallel to the z-axis. In this way, charge air turns 90° twice before exiting the compressor housing 1b.

A magnitude of a swirl imparted onto the charge air via the flap may modify a pressure exerted onto the impeller. The position of the flap may be adjusted based on a likelihood of compressor surge and/or stall occurring. Compressor surge may occur when a manifold pressure is greater than a pressure generated by the compressor. This may occur during low engine loads, downshift, quickly releasing an accelerator pedal, etc. As such, compressor surge may lead to degradation of the impeller and/or to turbo lag upon a subsequent tip-in. As such, during conditions when ambient pressure and/or charge air flow are too low, swirl may be increased to increase a pressure generated by the compressor 1 to prevent and/or limit compressor surge.

In the embodiments of FIGS. 3 and 4, the compressor housing 1b corresponding to a location of the duct 3 is similar to a toroid having no hole. In this way, charge air may only enter the duct via the inlet pipe 300. Furthermore, charge air may exit the compressor housing 1b only via the compressor outlet 1f. As such, the compressor 1 comprises no additional inlets and other outlets other than those described.

Thus, a system comprising a single-stage, radial compressor mechanically coupled to a turbine via a shaft, a duct arranged in a compressor housing upstream or and spaced away from the compressor, the duct being toroid shaped with a protrusion extending from its geometric center into an interior volume of the duct toward the compressor, an inlet pipe configured to flow charge air to the ring-shaped duct, the inlet pipe arranged perpendicularly to the shaft, and where the inlet pipe further comprises a flap misaligned with a geometric center of the inlet pipe, and a controller with computer-readable instructions stored thereon that when enabled allow the controller to adjust an angle of the flap to adjust an obstruction in the inlet pipe via rotating the flap about an axle parallel to the shaft to modify a charge air swirl based on one or more of an engine speed and engine load. The angle of the flap is measured relative to a direction of incoming charge air flow. The obstruction is increased in response to one or more of the engine speed being less than a threshold speed and the engine load being less than an engine load, and where the obstruction is decreased in response to one or more of the engine speed being greater than a threshold speed and the engine load being greater than a threshold load. The interior volume of the duct includes two arcs symmetrically spaced about the protrusion and where the two arcs are configured to receive charge air from the inlet pipe, and where a width of the interior volume narrows from the arcs toward the compressor. The compressor comprises an outlet pipe arranged perpendicularly to both the shaft and the inlet pipe. The compressor and ring-shaped duct comprise no other inlets or additional outlets other than the inlet and outlet pipes. The compressor does not include a compressor bypass.

FIG. 5 is a schematic diagram showing an example engine 10, which may be included in a propulsion system of an automobile. The engine 10 is shown with four cylinders or combustion chambers 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some examples, combustion chamber 30 may include two or more intake valves and/or two or more exhaust valves. Spark plugs 52 may protrude into combustion chambers 30 to provide an ignition source for combustion.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position (TP) of throttle plate 22 may be varied by controller 12 to enable electronic throttle control (ETC). In this manner, throttle 21 may be operated to vary the intake air provided to combustion chamber 30 among other engine cylinders.

Further, in the disclosed examples, an exhaust gas recirculation (EGR) system may route a desired portion of exhaust gas from exhaust passage 48 to intake passage 42 via EGR passage 166. The amount of EGR provided to intake passage 42 may be varied by controller 12 via EGR valve 164. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. The engine may additionally be provided EGR via low pressure EGR passage 166 and low pressure EGR valve 164. Low pressure EGR is routed from downstream of turbine 62 to upstream of a compressor 60.

Engine 10 may further include a compression device such as a turbocharger or supercharger including at least a compressor 60 arranged along intake passage 42 providing pressurized air to boost passage 32. Compressor 60 may be used similarly to compressor 1 of FIGS. 1-4. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine.

In one example, the engine of FIG. 1 may be coupled in a hybrid vehicle and the electric motor may be a motor used for providing electric compressor assist. A state of charge of the battery bank may increase during braking, in which the electric motor may act as a generator and restore electric charge to the battery bank. Alternatively, the battery bank may be recharged by a separate generator powered by the engine, allowing the battery bank to be recharged during non-braking occasions.

Exhaust passage 48 may include wastegate 26 for diverting exhaust gas around turbine 62. Likewise, intake passage 42 may include a compressor recirculation valve (CRV) 27 configured to divert a portion of boosted intake air from downstream of the compressor to upstream of the compressor. Wastegate 26 and/or CRV 27 may be controlled by controller 12 based on boost pressure demand. For example, during a tip-out (e.g., decrease in accelerator pedal position) when a lower boost pressure is demanded, one or more of the CRV and wastegate may be opened. Likewise, wastegate 26 may be closed to increase exhaust pressure upstream of turbine, such as responsive to a tip-in, thereby expediting turbine spool-up and boost delivery via the compressor. In this way, boost pressure may be improved by increasing assist provided to the compressor via the exhaust turbine from adjusting the wastegate. Compressor assistance may be put into action via decreasing an opening (or increasing a closing) of the wastegate to increase exhaust pressure upstream of the turbine. Thus, the compressor assist may reduce the delay in increasing a power output of the engine responsive to a throttle change, herein also referred to as turbo lag. As discussed above, the engine power delay may be due the delay in exhaust pressure generation and turbine spool-up demanded to provide the demanded boost.

Crankshaft 40 may be coupled to at least one drive wheel of a vehicle via an intermediate transmission system 150. The transmission system 150 may include a multiple fixed gear automatic transmission having a plurality of discrete gear ratios, clutches, etc. In one example, the transmission may have only 8 discrete forward gears and 1 reverse gear. Further, a starter motor may be coupled to crankshaft 40 via a flywheel to enable a starting operation of engine 10.

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have six available gears, where transmission gear six (transmission sixth gear) is the highest available gear and transmission gear one (transmission first gear) is the lowest available gear. In other examples, the vehicle may have more or less than six available gears.

As elaborated herein, a controller may vary the transmission gear (e.g., upshift or downshift the transmission gear) to adjust an amount of torque conveyed across the transmission and torque converter to vehicle wheels 156 (that is, an engine shaft output torque). The controller may initiate a transmission gear shift responsive to changes in the pedal position signal (PP) and vehicle speed. For example, as vehicle speed increases, the controller may upshift a transmission gear (e.g., from a transmission first gear to a transmission second gear). Alternatively, as PP decreases, the controller may downshift a transmission gear (e.g., from a transmission third gear to a transmission second or first gear). The transmission may be upshifted or downshifted by one or more transmission gears based on a difference between the initial gear ratio and the desired gear ratio. Further, the gear selection may be based on the final engine speed desired. For example, when the PP increases by a large amount, such as when the pedal is depressed fully to a wide open pedal (WOP) position, the controller may upshift the transmission by multiple gears in order to increase the amount of engine power that is transferred to the wheels.

As such, engine speed may vary based on the transmission gear selection. For example, during a transmission gear upshift, while the vehicle speed is held constant, the throttle opening is increased resulting in increased air mass flow to the engine, and a corresponding increase in engine speed. Likewise, during a transmission gear downshift, the throttle opening is reduced resulting in decreased air mass flow to the engine, and a corresponding decrease in engine speed. During upshift maneuvers electrical assist and/or intake air swirl to the turbocharger helps keep the amount of boost under control through the transient period which exists from the start to the end of the gear shifting event. Because the higher gear will drive the engine speed down at the moment of transmission engagement without assist, the turbocharger speed will fall together with engine speed. This may result in loss of boost. The loss of boost may be at least partially avoided via the motor maintaining compressor speed during the shifting event to maintain boost pressure up and improve vehicle response at the end of the shift event. In the case of downshifts, the wastegate opens gradually to help keep the turbocharger speed under control.

In addition to controlling engine speed during a transmission shift, engine speed control may also be demanded during engine idling conditions to maintain an engine idle torque. As such, the engine idle speed is the rotational speed the engine runs at when the engine is uncoupled from the drivetrain and the accelerator pedal is not depressed, or when the vehicle is stopped with a transmission gear engaged and the accelerator pedal not depressed. At idle speed, the engine generates enough torque and power to smoothly operate engine ancillary components such as power steering, alternator, etc., and to propel the vehicle in first gear at less than a threshold speed. As an example, during engine idling conditions, engine control parameters and actuators may be adjusted to hold the engine speed at or around 700-900 rpm.

Maintenance of engine speed (herein also referred to as engine speed control) may be less effective when the vehicle engine is operated at higher than a threshold ambient altitude (e.g., above 2000 m). For example, when a hybrid vehicle with a boosted engine is operated at higher altitudes, both engine idle speed control and transmission shift engine speed control may be affected by a reduction in air density. Specifically, the engine speed may be lower than desired due to the lower air availability in the atmosphere at the higher altitude. As a result of this drop in air density, and the corresponding drop in engine speed from the desired speed, engine performance may decrease and engine operation may appear sluggish. The sluggish engine performance may affect vehicle drivability when the vehicle is operated in regions where the average altitude is higher.

Controller 12 is shown in FIG. 5 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted air mass flow from MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, Hall effect sensor 118, which is also used as an engine speed sensor, may produce a predetermined number of equally spaced pulses each revolution of the crankshaft 40.

Controller 12 may further receive information regarding the location of the vehicle from an on-board global positioning system (GPS) 180. Information received from the GPS 180 may include vehicle speed, vehicle altitude, vehicle position, etc. This information may be used to infer engine operating parameters, such as local barometric pressure. Controller 12 may further be configured to receive information via the internet or other communication networks. Information received from the GPS 180 may be cross-referenced to information available via the internet to determine local weather conditions, local vehicle regulations, local traffic conditions, etc. Controller 12 may use the internet to obtain updated software modules which may be stored in non-transitory memory therein. Additionally or alternatively, sensor 180 may be a barometric sensor.

Other sensors that may send signals to controller 12 include a temperature sensor 124 at an outlet of a charge air cooler 80, and a boost pressure sensor 126. Other sensors not depicted may also be present, such as a sensor for determining the intake air velocity at the inlet of the charge air cooler, and other sensors.

The controller 12 receives signals from the various sensors of FIG. 5 and employs the various actuators of FIG. 5 to adjust engine operation based on the received signals and instructions stored on a memory of the controller. For example, adjusting a position of the flap 4 may include adjusting an actuator of an axle (e.g., axle 4a of FIG. 1A) to adjust charge air swirl. A desired position of the flap may be based on one or more of a throttle position, manifold pressure, and engine load and speed.

The controller may include instruction that when implemented enable to controller to implement a method comprising adjusting an angle formed between a flap of a duct and an impeller of a compressor, the compressor located downstream of the duct, wherein decreasing the angle increases an obstruction of an inlet pipe of the duct and where increasing the angle decreases the obstruction of the inlet pipe; where the duct is a toroid with an indentation at its geometric center extending into a volume of the duct toward the impeller of the compressor. Decreasing the angle occurs in response to an engine load falling below a threshold load or an engine speed falling below a threshold speed, and where increasing the angle occurs in response to the engine load increasing above the threshold load or the engine speed increasing above the threshold speed. The method further comprises flowing charge air past the flap, the flap imparting a swirl onto the charge air prior to directing the charge air through the duct and into the compressor.

Figure 6:
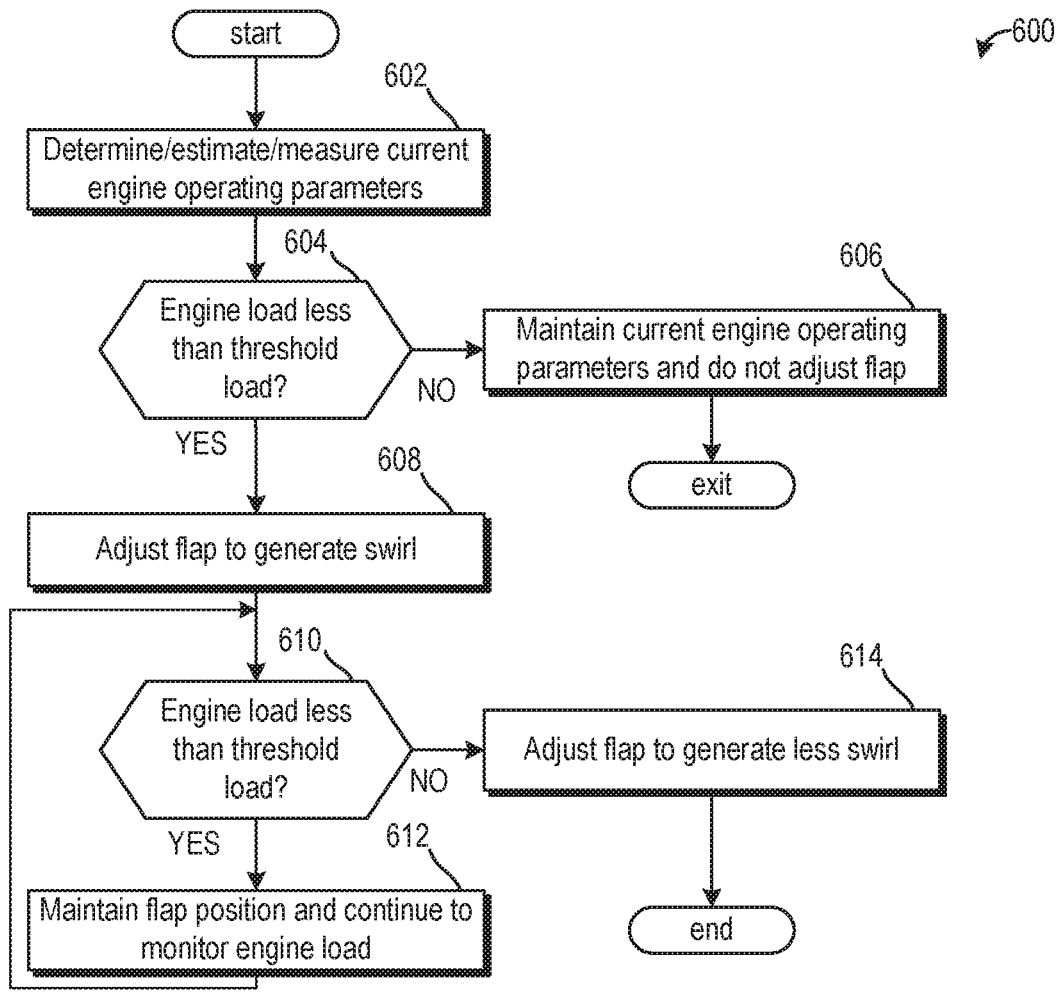
FIG. 6 shows a method for operating a flap of the compressor.

FIG. 6 shows an exemplary method 600 for determining adjusting a position of a flap based on an engine load. Instructions for carrying out method 600 may be executed by a controller based on instructions stored on a memory of the controller and in conjunction with signals received from sensors of the engine system, such as the sensors described above with reference to FIG. 5. The controller may employ engine actuators of the engine system to adjust engine operation, according to the methods described below.

Adjusting the ratio may further include adjusting the ratio based on a transmission gear shift and an operator pedal tip-in. In one example, the routine adjusts the amount of fuel injection based on relative humidity. For example, the controller may determine a control signal to send to the fuel injector actuator, such as a pulse width of the signal being determined based on a determination of the relative humidity. The relative humidity may be based on a measured humidity, or determined based on operating conditions such as. The controller may determine the pulse width through a determination that directly takes into account a determined relative humidity, such as increasing the pulse width with increasing humidity. The controller may alternatively determine the pulse width based on a calculation using a look-up table with the input being relative humidity and the output being pulse-width.

The method 600 may begin at 602 by estimating, determining, and/or measuring current vehicle operating conditions. The vehicle operating conditions may include one or more of but are not limited to engine speed, engine load, vehicle altitude, throttle position, compressor speed, EGR flow rate, engine temperature, accelerator pedal position, mass air flow, and air/fuel ratio.

At 604, the method 600 includes determining an engine load is less than a threshold engine load. The threshold engine load is based on a low to mid load, in one example. If the engine load is a mid-load or a high-load, then the method 600 proceeds to 606 to maintain current engine operating parameters and does not adjust a flap (e.g., flap 4 of FIGS. 1A and 1B) to a more angled position. As such, compressor surge is unlikely and swirl is undesired. Therefore, charge air may readily flow into the duct (e.g., duct 3 of FIGS. 1A and 1B) with minimal influence from the flap.

If the engine load is a low load or the engine is at idle, then the load is less than the threshold engine load and the method proceeds to 608 to adjust a position of the flap to generate swirl. More swirl may be generated by increasing an angle of the flap relative to a direction of charge air flow. As such, a charge air flow path of the duct is more obstructed by the flap, thereby increasing contact between charge air and the flap, resulting in increased swirl which may limit or prevent compressor surge. In some examples, additionally or alternatively, the flap is oscillated between two or more desired positions of the flap to generate increasing amount of swirl which may be constructive or destructive in the duct.

Additionally or alternatively, the method 600 may include comparing an engine speed to a threshold engine speed at 604. The threshold engine speed may be based on an engine speed where pressure at an outlet of a compressor is greater than a pressure at an inlet of a compressor. As such, engine speed may be taken into consideration at 604. In some examples, engine speed is taken into consideration with engine load. In other examples, the two conditions are taken into consideration separately. For example, if one or more of the engine load is less than the threshold engine load and the engine speed is less than the threshold engine speed, then the method 600 proceeds to 608. For example, if the engine load is greater than the threshold engine load and the engine speed is less than the threshold engine speed, then the method 600 proceeds to 608. Thus, to proceed to 606 when taking engine speed and engine load into consideration, both parameters are greater than their respective thresholds.

At 610, the method 600 proceeds to 610 to determine if the engine load is less than the threshold load. If the engine load is less than the threshold load, then the method 600 proceeds to 612 to maintain the flap position and continues to monitor the engine load. If the engine load has increased since 604, then the method 600 proceeds to 614 to adjust the flap to generate less swirl. This may include adjusting the flap to a position where the charge air flow path of the duct is less obstructed and less charge air collides with the flap. In one example, the flap is move to a position more parallel to a direction of charge air flow into the duct at 614. As such, charge air flow through the duct and into the compressor is smoother and has less turbulence imparted onto it from the flap.

In this way, a duct having a rotatable flap may adjust a turbulence and orientation of charge air to a compressor. The technical effect of adjusting the turbulence and orientation of charge air to a compressor is to decrease a likelihood of compressor surge during lower engine loads. As such, the flap may influence charge air flow through the duct upstream of the compressor. By adjusting the flap, swirl may be generated when desired. Furthermore, adjusting the flap may also prevent and/or decrease swirl during conditions where swirl is undesired. As such, compressor surge is mitigated and charge air flow is oriented as desired based on actuation of the flap.

In one example, a supercharged internal combustion engine comprising an intake system comprising a compressor having at least one impeller which is arranged on a rotatable shaft in a compressor housing and is equipped with impeller blades, wherein the intake system has, upstream of the at least one impeller, a section which runs transversely with respect to a virtual elongation of the shaft of the compressor and where a pivotable flap is arranged, said section splitting, at least on the side facing away from the at least one impeller, into arcuate ducts which merge so as to form a ring-shaped duct which is open on the side facing toward the at least one impeller. A first example of the supercharged engine further includes where the section perpendicularly intersects the virtual elongation of the shaft of the compressor. A second example of the supercharged engine, optionally including the first example, further includes pivotable flap is arranged centrally in the section, and where charge air is conducted past both sides of the flap for some positions of the flap, and where charge air is conducted past only one side of the flap for other positions of the flap. A third example of the supercharged engine, optionally including one or more of the first and/or second examples, further includes where the flap is pivotable about an axis which runs substantially parallel to the shaft of the compressor. A fourth example of the supercharged engine, optionally including one or more of the first through third examples, further includes where the ring-shaped duct is circular and is symmetrically spaced about the virtual elongation of the shaft of the compressor. A fifth example of the supercharged engine, optionally including one or more of the first through fourth examples, further includes where the ring-shaped duct is arranged upstream of and spaced away from the at least one impeller, and where the ring-shaped duct is fluidly coupled to the compressor via an inlet region coaxial to the shaft of the compressor. A sixth example of the supercharged engine, optionally including one or more of the first through fifth examples, further includes where the compressor is upstream of a throttle device, wherein the throttle device is a throttle flap. A seventh example of the supercharged engine, optionally including one or more of the first through sixth examples, further includes where the compressor is a radial compressor and is located upstream of a charge-air cooler located in the intake system. An eighth example of the supercharged engine, optionally including one or more of the first through seventh examples, further includes where the compressor is coupled to a turbine via the shaft, the turbine being arranged in an exhaust passage.

An example of a method comprising adjusting an angle between a flap of a duct and an impeller of a compressor, the compressor located downstream of the duct, wherein decreasing the angle increases an obstruction of an inlet pipe of the duct and vice versa, the duct being a toroid with an indentation at its geometric center extending into a volume of the duct toward the impeller of the compressor. A first example of the method further includes where the angle is decreased in response to an engine load falling below a threshold load or an engine speed falling below a threshold speed, and where the angle is increased in response to the engine load increasing above the threshold load or the engine speed increasing above the threshold speed. A second example of the method, optionally including the first example, further includes where flowing charge air past the flap, the flap imparting a swirl onto the charge air prior to directing the charge air through the duct and into the compressor.

A system comprising a single-stage, radial compressor mechanically coupled to a turbine via a shaft, a duct arranged in a compressor housing upstream or and spaced away from the compressor, the duct being toroid shaped with a protrusion extending from its geometric center into an interior volume of the duct toward the compressor, an inlet pipe configured to flow charge air to the ring-shaped duct, the inlet pipe arranged perpendicularly to the shaft, and where the inlet pipe further comprises a flap misaligned with a geometric center of the inlet pipe, and a controller with computer-readable instructions stored thereon that when enabled allow the controller to adjust an angle of the flap to adjust an obstruction in the inlet pipe via rotating the flap about an axle parallel to the shaft to modify a charge air swirl based on one or more of an engine speed and engine load. A first example of the system further includes where the angle of the flap is measured relative to a direction of incoming charge air flow. A second example of the system, optionally including the first example, further includes where the obstruction is increased in response to one or more of the engine speed being less than a threshold speed and the engine load being less than an engine load, and where the obstruction is decreased in response to one or more of the engine speed being greater than a threshold speed and the engine load being greater than a threshold load. A third example of the system, optionally including the first and/or second examples, further includes where the interior volume of the duct includes two arcs symmetrically spaced about the protrusion and where the two arcs are configured to receive charge air from the inlet pipe, and where a width of the interior volume narrows from the arcs toward the compressor. A fourth example of the system, optionally including one or more of the first through third examples, further includes where the compressor comprises an outlet pipe arranged perpendicularly to both the shaft and the inlet pipe. A fifth example of the system, optionally including one or more of the first through fourth examples, further includes where the compressor and ring-shaped duct comprise no other inlets or additional outlets other than the inlet and outlet pipes. A sixth example of the system, optionally including one or more of the first through fifth examples, further includes where a charge-air cooler and a throttle located downstream of the compressor relative to a direction of charge air flow. A seventh example of the system, optionally including one or more of the first through sixth examples, further includes where the compressor does not include a compressor bypass.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A supercharged internal combustion engine comprising:
an intake system comprising a compressor having at least one impeller which is arranged on a rotatable shaft in a compressor housing and is equipped with impeller blades, wherein the intake system has, upstream of the at least one impeller, a section which runs transversely with respect to a virtual elongation of the shaft of the compressor and where a pivotable flap is arranged, said section splitting, at least on the side facing away from the at least one impeller, into arcuate ducts which merge so as to form a ring-shaped duct which is open on the side facing toward the at least one impeller, wherein the section perpendicularly intersects the virtual elongation of the shaft of the compressor, and wherein the compressor comprises an outlet pipe arranged perpendicularly to both the shaft and an inlet pipe of the compressor.

2. The supercharged internal combustion engine of claim 1, wherein the pivotable flap is arranged centrally in the section, and where air is conducted past both sides of the flap for some positions of the flap, and where air is conducted past only one side of the flap for other positions of the flap.

3. The supercharged internal combustion engine of claim 1, wherein the flap is pivotable about an axis which runs substantially parallel to the shaft of the compressor.

4. The supercharged internal combustion engine of claim 1, wherein the ring-shaped duct is circular and is symmetrically spaced about the virtual elongation of the shaft of the compressor.

5. The supercharged internal combustion engine of claim 1, wherein the ring-shaped duct is arranged upstream of and spaced away from the at least one impeller, and where the ring-shaped duct is fluidly coupled to the compressor via an inlet region coaxial to the shaft of the compressor.

6. The supercharged internal combustion engine of claim 1, wherein the compressor is upstream of a throttle device, wherein the throttle device is a throttle flap.

7. The supercharged internal combustion engine of claim 1, wherein the compressor is a radial compressor and is located upstream of a charge-air cooler located in the intake system.

8. The supercharger internal combustion engine of claim 1, wherein the compressor is coupled to a turbine via the shaft, the turbine being arranged in an exhaust passage.

9. A method comprising:
adjusting an angle between a flap of a duct and an impeller of a compressor coupled to a turbine via a shaft, the compressor located downstream of the duct, wherein decreasing the angle increases an obstruction of an inlet pipe of the duct and vice versa,
the duct being a toroid with an indentation at its geometric center extending into a volume of the duct toward the impeller of the compressor, and wherein the compressor comprises an outlet pipe arranged perpendicularly to both the shaft and the inlet pipe.

10. The method of claim 9, wherein the angle is decreased in response to an engine load falling below a threshold load or an engine speed falling below a threshold speed, and where the angle is increased in response to the engine load increasing above the threshold load or the engine speed increasing above the threshold speed.

11. The method of claim 9, further comprising flowing air past the flap, the flap imparting a swirl onto the air prior to directing the air through the duct and into the compressor.

12. A system comprising:
a single-stage, radial compressor mechanically coupled to a turbine via a shaft;
a duct arranged in a compressor housing upstream or and spaced away from the compressor, the duct being toroid shaped with a protrusion extending from its geometric center into an interior volume of the duct toward the compressor;
an inlet pipe configured to flow air to the ring-shaped duct, the inlet pipe arranged perpendicularly to the shaft, and where the inlet pipe further comprises a flap which is pivotable about a pivot at a geometric center of the inlet pipe; and
a controller with computer-readable instructions stored thereon that when enabled allow the controller to:
adjust an angle of the flap to adjust an obstruction in the inlet pipe via rotating the flap about an axle parallel to the shaft to modify a charge air swirl based on one or more of an engine speed and an engine load, wherein the compressor comprises an outlet pipe arranged perpendicularly to both the shaft and the inlet pipe.

13. The system of claim 12, wherein the angle of the flap is measured relative to a direction of incoming air flow.

14. The system of claim 13, wherein the obstruction is increased in response to one or more of the engine speed being less than a threshold speed and the engine load being less than a threshold load, and where the obstruction is decreased in response to one or more of the engine speed being greater than the threshold speed and the engine load being greater than the threshold load.

15. The system of claim 12, wherein the compressor and the ring-shaped duct comprise no other inlets or additional outlets other than the inlet and outlet pipes.

16. The system of claim 12, further comprising a charge-air cooler and a throttle located downstream of the compressor relative to a direction of air flow.

17. The system of claim 12, wherein the compressor does not include a compressor bypass.

* * * * *